Patented June 1, 1937

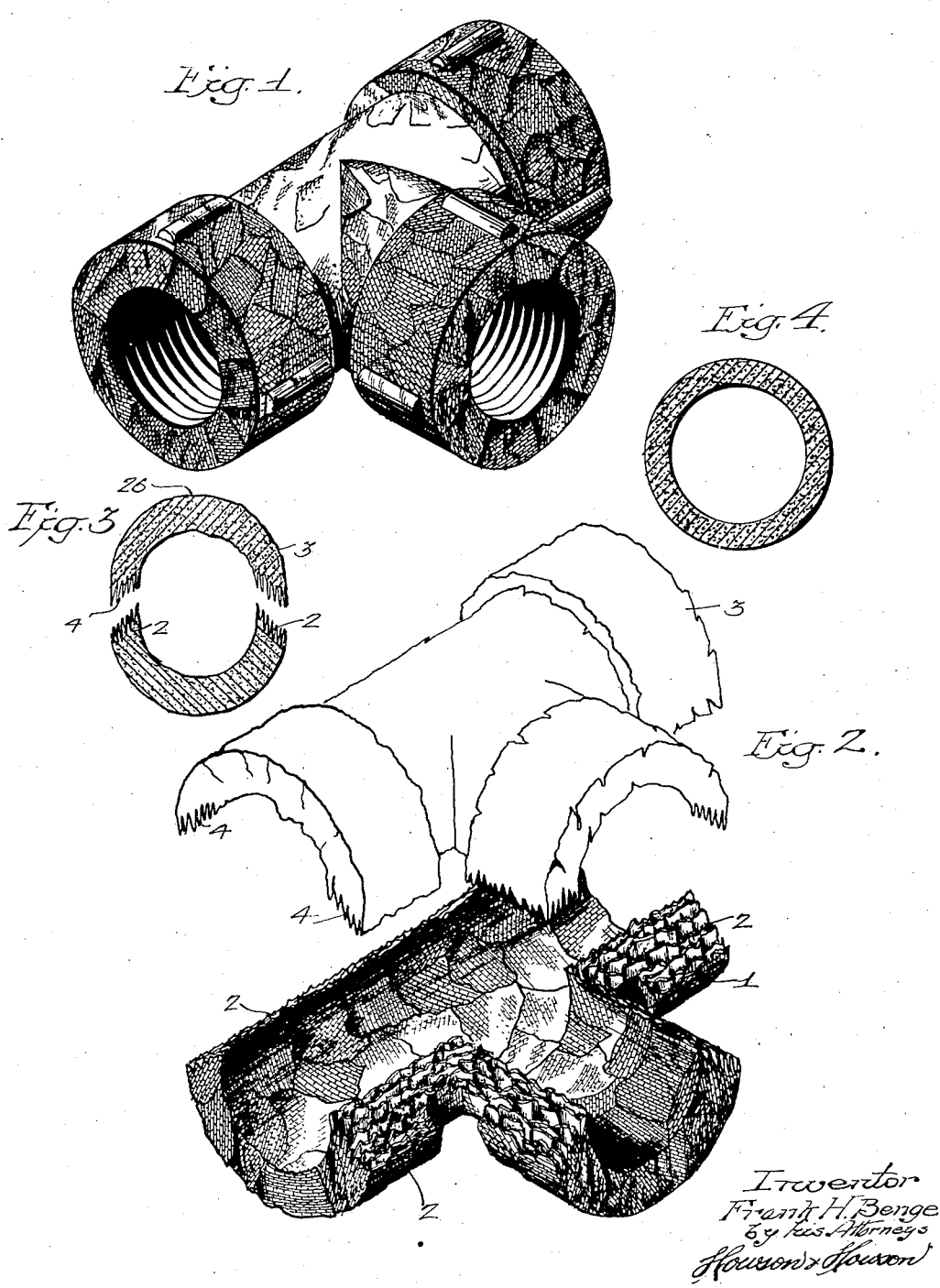

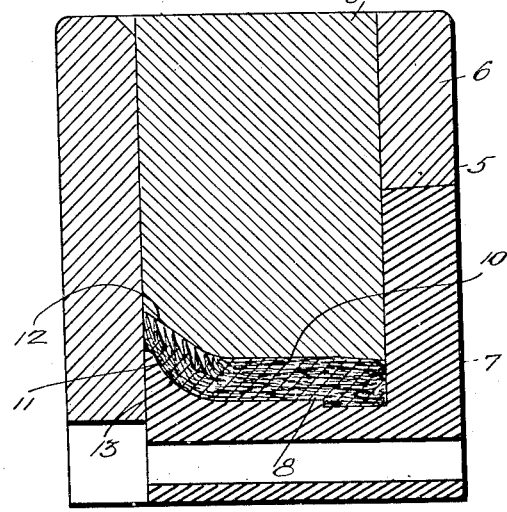
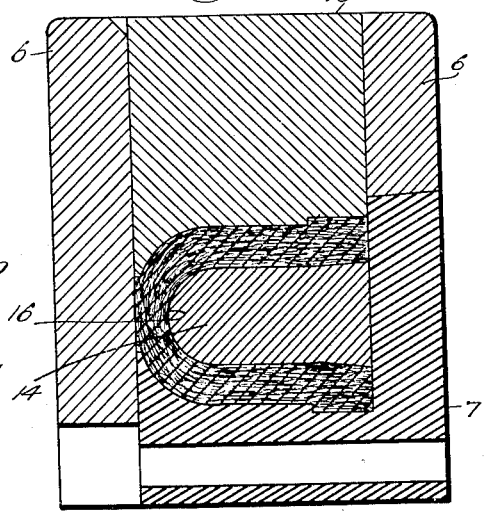
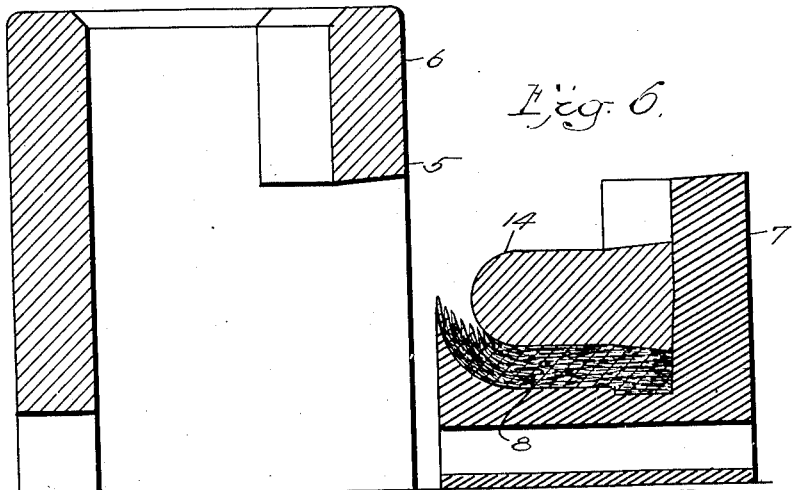
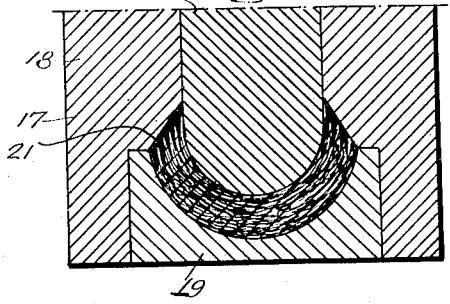
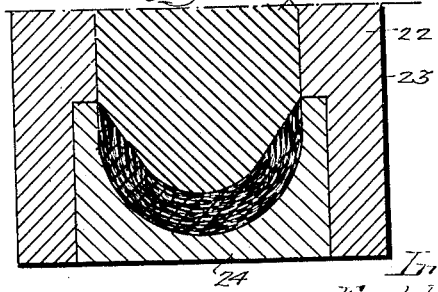

2,082,611

UNITED STATES PATENT OFFICE 2,082,611

PIPE FITTING AND LIKE ARTICLE

Frank H. Benge, Norristown, Pa., assignor to Continental-Diamond Fibre Company, Newark, Del., a corporation of Delaware Original application May 15, 1933, Serial No. 671,260, now Patent No. 2,003,232, dated May 28, 1935. Divided and this application May 1, 1935, Serial No. 19,276

5 Claims. (Cl. 285—210)

This invention relates to hollow articles and more particularly to such articles as pipes, pipe fittings and the like. The present application is a division of my copending application, Serial No. 671,260, filed May 15, 1933, now Patent No. 2,003,232, of May 28, 1935.

One object of the invention is to provide an article of this class which is strong mechanically and highly resistive to corrosion or other chemical action. The invention is directed particularly to pipes and pipe fittings since such articles are oftentimes subjected to corrosive action particularly by contact with the fluids carried thereby.

A further object of the invention is to provide an article of the class mentioned which is composed of fibrous material and an associated binder, and the walls of which form a contiguous, homogeneous, coherent structure free of lines or planes of cleavage and uniformly massed by intermingling and coherence of its constituent fibrous material and the binder.

The construction of the improved article may be more clearly understood from the following detailed description and the accompanying drawings.

In the drawings:

Figure 1 is a perspective view of a pipe fitting in the form of a T fitting which has been constructed in accordance with the invention;

Figure 2 is a perspective view of two preformed parts of the unfinished article made during the process of manufacture shown in Figures 8 and 9;

Figure 3 is a sectional view of the two preformed parts shown in Figure 2 supplementing the illustration of the loose ragged edges;

Figure 4 is a sectional view of the completed fitting showing the uniform homogeneous structure;

Figures 5 to 7 are sectional views illustrating the preferred method of making the article; and Figures 8 and 9 are sectional views illustrating an alternative method of making the article.

Heretofore, it has been common practice to use hard rubber in the manufacture of articles of the class in question for the reason that hard rubber is, to some extent, resistant to corrosion. Due to the relatively brittle nature of the hard rubber, however, its use is limited to relatively low pressures. Furthermore, hard rubber distorts at elevated temperatures and its use is, therefore, limited to temperatures below approximately 130° F.

The present invention contemplates broadly the use of any fibrous material and an associated binder which may be found suitable. Preferably, however, irregularly-shaped small pieces of cotton base fabric impregnated with synthetic resin of the phenolic type and, more especially, phenol-formaldehyde resin is used. Other fibrous materials which are applicable for use, are asbestos in fibre or paper form, wood pulp, paper, etc. The choice of the particular fibrous filling material will be guided in any instance by the use for which the article is intended. Where the greatest possible strength is the controlling factor, small pieces of fabric are employed. In any case, there should be associated with the fibrous filling material sufficient resin to protect the material from the corrosive action of the chemical being transported and to give a strong unitary article. In the case of cotton base fabric, there is preferably associated with the fabric approximately 45% to 50% of resin. The cotton fabric is preferably the resin-impregnated waste material resulting from the manufacture of laminated products, cut into suitable size. For example, the resin-impregnated fibrous pieces may vary widely in size from ⅛ inch at the smallest width up to one inch at the greatest width. If in a particular instance the amount of resin associated with the fibrous filling material is not sufficient to bring the resin content up to the desired amount, powdered resin in sufficient amounts may be added. Regardless of the type of fibrous filler, the resin content of the finished article is preferably in the neighborhood of 45% to 50%. The type of binder most applicable is a synthetic resin either of the thermo-setting or thermo-plastic type. The particular binder chosen is governed by the use for which the article is intended and one is used which is chemically inert to the material to be transported. While phenol-formaldehyde resins are preferable for the transportation of acids, polybasic-acid-polyhydric-alcohol and urea-formaldehyde resins are applicable for use for special purposes. Aniline-formaldehyde resins of the infusible thermo-plastic type are especially applicable for the transportation of alkaline solutions. In making the article of the present invention, the temperature, pressure and time conditions are selected which are applicable in conjunction with the particular resin. Hereinafter the invention will be described with the use of phenol-formaldehyde resins as illustrative.

As well known, phenolic resins exist in an initial or soluble and fusible stage and in a final or insoluble and infusible stage. The conversion of the resin from the initial to the final stage may be effected by heat or by heat and pressure. In either of the methods illustrated herein, a preform of the article is made or built up of the small fibrous pieces, constituting the filler, impregnated with resin in its initial stage. Following this, the preform is treated to convert the resin to its final stage and to render the article a unitary and compact body.

Referring now to the drawings, the completed article, which is illustrated in Figure 1 as a T pipe fitting and which has the structure and characteristics hereinbefore mentioned, may be made in accordance with the invention in any suitable manner, for example, by either of the two methods described hereinafter. In each of these methods, the part shown at 1 in Figure 2 is formed as a preformed part with a relatively dense body and less dense ragged or fluffy edges 2. Preferably, these edges take a tapered form as illustrated more clearly in Figure 3. In the preferred method of making the article, after the preform 1 has been made the preform of the entire article is produced by depositing sufficient material to build up completely the preform of the article. This is accomplished by placing additional amounts of like material in a mold about a core in cooperative relation with the preformed part. In the alternative method of making the article, a second preform 3 is formed which has ragged or fluffy edges 4 that are similar and complementary to the edges 2 and adapted to unite therewith in a manner explained more fully hereinafter. For the sake of clarity of illustration, preform 3 is shown in Figure 2 without specific illustration of the fibrous pieces, but it will be understood that this preform is similar to preform 1. The two preformed parts are brought together as illustrated in Figure 3 and are firmly united to form the completed preform as shown in Figure 4.

Referring now to Figures 5 to 7 for a clear understanding of one method, there is shown a mold 5 having a body or casing 6 and a removable drawer-like mold member 7. The sectional views of this mold and the material associated therewith are taken through the center of the mold along a plane transversely bisecting the head of the mold. The bottom surface 8 of the mold member 7 has the contour of the lower part of the fitting which it is desired to form. With the drawer-like mold member in place in the mold, a predetermined quantity of the resin-impregnated fibrous pieces is deposited in the mold upon the horizontal portions of surface 8 by simply dropping them from the top thereof. The predetermined quantity of material is just sufficient to properly form the preformed part 1 above mentioned. A plug or male mold member 9, having the general contour shown in Figure 5, is then inserted into the mold with sufficient force to compress and preform the material in the desired manner. When the flat compression surface 10 of the plug engages the material in the mold and compresses the same, some of the material is forced upward into the angular space between the mold members, as illustrated at 11. The inclined surface 12 of plug 9 is not a compression surface but merely serves to define, in conjunction with the curved surface 13 of mold member 7, a space into which the material may slide or flow loosely due to compression of the bulk or body thereof by the surface 10. In any particular instance, depending on the size and shape of the article being formed, the amount of material used, as well as the pressure applied to plug 9, must be such as to result in this desired action. The material may be preformed in cold state or may be heated. The higher the temperature, the more readily will the material flow and the lower the pressure required. In any instance, the proper quantity of material and pressure may be readily determined, as for example by experimentation. As an example, however, of the approximate requirements, in the case of a standard 1½ inch T whose branches are 2 1/16 inches long and whose wall thickness in the preformed state is approximately ¾ inch I have found it advisable to use approximately 275 grams of material and to exert a pressure of approximately 2,250 pounds per square inch in making the preformed part. In general, the pressure will vary between 1,500 and 3,000 pounds per square inch.

The action of the material during compression thereof by plug 9 results in the formation of the rough or ragged tapered or wedge-like edge 2 above mentioned. This edge is composed of the loose or fluffy ends of the impregnated material which are not compressed, as above noted.

Following the formation of the preformed part 1 in the manner above described, plug 9 is removed and the mold member 7, with the preformed material carried thereby, is slidably moved out of the mold proper as illustrated in Figure 6. A fusible core 14 having the size and shape of the void or space within the finished pipe fitting is placed upon the preformed material. This core may be made of any suitable fusible alloy, for example, any alloy whose melting point is above the temperature used in the molding operation hereinafter described, such as an alloy whose melting point is in the neighborhood of 300° F. to 350° F.

The mold member 7 is again slidably moved into the mold proper and a predetermined quantity of the resin-impregnated fibrous pieces is deposited within the mold about the upper part of the core. This second quantity of material should be just sufficient to form the upper part of the complete preform of the article and may be approximately the same amount of material as that used for the lower part. The material is deposited upon the upper substantially flat surface of the core. A plug or male mold member 15 is inserted within the mold against the deposited material and pressure is applied to the plug to compress the deposited material and to firmly unite such material with the previously formed part. The pressure applied to plug 15 causes the material adjacent the curved surface 16 of core 14 to move or slide into the space between the core and the mold wall and to intermix and unite with the ragged edge of the lower preformed part. By virtue of the looseness of the materials coming together to form the joint of the two parts of the article, the materials intermingle or intermix to form a unitary article having no plane or line of cleavage but in which the entire structure is uniformly constituted as a homogeneous mass.

The completed preform of the article, together with the fusible core therein, is placed in a suitable mold and subjected to sufficient heat and pressure to convert the resin to its final form and to consolidate the filling material and associated binder into a compact unitary body. If phenolformaldehyde resin is used, a temperature of 250° F. to 275° F. is maintained for a period of from one-half hour to one hour, depending upon the thickness of the walls, and during this time, a pressure of approximately 2,000 pounds per square inch is maintained. The article is then removed and the core is melted out by subjecting it to a temperature high enough to liquefy it. The article is then subjected to the proper machining to impart to it a finished appearance and to provide the internal threads in the case of a pipe fitting.

If desired, instead of machining the threads, they may be provided by molding during the molding operation. In such case, a core may be used which comprises a fusible body having recessed ends and threaded end plugs of relatively infusible metal or alloy, such as steel, each of the plugs having an integral pin fitting removably into the recess of the body end. During molding the threaded plugs form the internal threads in the ends of the fitting. After molding, the plugs may be removed by unscrewing them from the ends of the fitting, after which the body of the core may be removed by heating the fitting to the melting point of the fusible core.

Figures 8 and 9 illustrate the formation of the two preformed parts during the making of the article in accordance with an alternative method. These views are taken near one of the ends of the mold in order to more clearly illustrate the formation of the complementary edges that are provided on the preformed parts. Referring to Figure 8, the preformed part 1 is formed by means of a mold designated generally by reference character 17. This mold comprises a body or casing 18 and a removable mold member 19. With the parts in cooperative relation, a predetermined quantity of material is deposited in the manner above described, and a plug 20, having a lower surface of the contour of the internal wall of the fitting, is inserted into the mold under pressure. The compression of the material thus effected causes the material to move or flow upward into the tapered spaces 21 between the plug and mold wall. This action is similar to that above described in connection with the first method and results in the formation on the preformed part of wedge-like or tapered ragged edges.

A second preformed part of the article is formed in a mold such as is illustrated at 22 in Figure 9, this mold also comprising relatively movable parts 23 and 24. The preforming operation is preformed in the same general manner as above described, a plug 25 being used to compress the material in the mold and to effect the desired formation of the ragged edges. The edges of the two preformed parts are generally complementary, as illustrated.

The material of the two preformed parts may be cold pressed or may be heated sufficiently to cause it to flow more readily. This may be done by bringing the impregnated material into contact with the hot plate at a temperature and for a time sufficient to cause the resin to flow. After the two preformed parts have been removed from their respective molds, they are placed in cooperative relation with each other about a fusible core in a suitable mold and are subjected to heat and pressure as above described to form the unitary and compact article. Following this, the core is melted out and the article is finished as above described.

In the manufacture of the article by either of the two methods described, it is desirable in making the preformed parts not to compress the body portions of these parts to the final thickness because during the final molding process the increased thickness of the body portions causes the material to flow toward the edges or joint portion and thereby insures complete intermingling of the fibrous pieces at the joint portion. After preforming and before molding, the body portions of the preformed parts should, as shown for example at 26 in Figure 3, have an increased thickness of about 25% of the final thickness.

The article of the present invention is seamless and has no inherent weak portions. This is particularly important in the case of pipe fittings where the tapered threads of an inserted pipe have a tendency to split or fracture the threads of the fitting. Tests of articles made in accordance with the present invention have shown that there is no weak portion and breaking or fracture may occur under excessive pressure at any part of the article. There is no tendency for the break or fracture to occur where the two sections of the article are joined together. This results from the fact that the structure is unitary and uniform and there is no section where the resin alone binds the article, the fibrous pieces being equally intermingled throughout the structure.

It has been found that the pipe fittings of this invention are very durable as well as highly resistive to corrosion. Such articles will readily withstand liquid pressures of 150 pounds per square inch or higher with a large factor of safety. Pressures higher than these are not normally encountered in the transportation of chemicals and, therefore, the invention is applicable for use in practically all chemical industries. Fracture tests have determined that such articles will actually withstand very high pressures, the breaking strength being from 750 pounds to 1,000 pounds per square inch, thus assuring a large factor of safety in the use of these articles for ordinary purposes.

Another important feature of such articles is that the resin-impregnated fibrous material has a certain amount of inherent resiliency which imparts to the article a tendency to pack when subjected to pressure. This packing tendency causes an effective sealing of joints and thus provides a substantially leak-proof structure. The articles of the present invention are not distorted by elevated temperatures and therefore may be used at all temperatures within the range encountered in the chemical industries in the transportation of liquids.

It will be seen that the invention provides an integral article or product composed of irregularly-shaped fibrous pieces and having irregular lines of cleavage between the massed pieces but being free from any set or definite line of cleavage.

While there have been disclosed herein two specific methods of making the improved article of the invention, it will be understood that any other suitable method may be employed. The scope of the invention is defined by the appended claims.

I claim:

1. An integral pipe fitting or like structure composed of binder-impregnated irregularly-shaped pieces of fibrous material massed together in interspersed relation to form a wall structure having irregular lines of cleavage between the component pieces but being free from any set or definite line of cleavage.

2. An integral pipe fitting or like structure composed of synthetic resin-impregnated irregularly-shaped pieces of fibrous sheet material massed together in interspersed relation to form a wall structure having irregular lines of cleavage between the component pieces but being free from any set or definite line of cleavage.

3. An integral pipe fitting or like structure composed of binder-impregnated irregularly-shaped small pieces of fabric massed together in interspersed relation to form a wall structure having irregular lines of cleavage between the component pieces but being free from any set or definite line of cleavage.

4. An integral pipe fitting or like structure composed of synthetic resin-impregnated irregularly-shaped small pieces of fabric massed together in interspersed relation to form a wall structure having irregular lines of cleavage between the component pieces but being free from any set or definite line of cleavage.

5. An integral pipe fitting or like structure composed of irregularly-shaped small pieces of fabric impregnated with heat-converted phenol-formaldehyde resin and massed together in interspersed relation to form a wall structure having irregular lines of cleavage between the component pieces but being free from any set or definite line of cleavage.

FRANK H. BENGE.